(12) United States Patent (10) Patent No.: US 9,012,131 B2
Shen et al. (45) Date of Patent: Apr. 21, 2015

(54) METHOD FOR FABRICATING LIQUID CRYSTAL DISPLAY

(75) Inventors: Hung-Ming Shen, Miao-Li County (TW); Kai-Neng Yang, Miao-Li County (TW); Wan-Ling Huang, Miao-Li County (TW)

(73) Assignees: Innocom Technology (Shenzhen) Co., Ltd., Longhua Town, Bao An District, Shenzhen (CN); Innolux Corporation, Miao-Li County (TW)

( * ) Notice: Subject to any disclaimer, the term of this patent is extended or adjusted under 35 U.S.C. 154(b) by 527 days.

(21) Appl. No.: 13/418,253

(22) Filed: Mar. 12, 2012

(65) Prior Publication Data

US 2012/0252299 A1 Oct. 4, 2012

(30) Foreign Application Priority Data

Mar. 28, 2011 (TW) .............................. 100110556 A

(51) Int. Cl.
*G02F 1/1337* (2006.01)
(52) U.S. Cl.
CPC .... *G02F 1/133703* (2013.01); *G02F 1/133788* (2013.01)
(58) Field of Classification Search
None
See application file for complete search history.

(56) References Cited

U.S. PATENT DOCUMENTS

| 2003/0231272 | A1* | 12/2003 | Nakamura et al. ............ 349/123 |
| 2005/0140882 | A1 | 6/2005 | Park |
| 2006/0279502 | A1 | 12/2006 | Chang |
| 2012/0177847 | A1 | 7/2012 | Nakamura et al. |
| 2012/0274888 | A1 | 11/2012 | Hirai et al. |
| 2013/0027639 | A1* | 1/2013 | Chien et al. ..................... 349/84 |

FOREIGN PATENT DOCUMENTS

| CN | 1462898 | 12/2003 |
| CN | 101013262 | 8/2007 |
| CN | 101329479 | 12/2008 |
| CN | 101387781 | 3/2009 |
| TW | 200600938 | 1/2006 |
| TW | 201105713 | 2/2011 |

OTHER PUBLICATIONS

Taiwanese language office action dated Feb. 27, 2014.
Chinese language office action dated May 6, 2014.
(Continued)

*Primary Examiner* — John A. McPherson
(74) *Attorney, Agent, or Firm* — McClure, Qualey & Rodack, LLP

(57) ABSTRACT

The invention provides a method for fabricating a liquid crystal display, including: providing a first substrate and a second substrate, wherein the first substrate and the second substrate are disposed oppositely to each other; filling a mixed solution between the first substrate and the second substrate, wherein the mixed solution comprises a plurality of liquid crystal molecules and a plurality of monomers; performing a UV light irradiation process to the mixed solution, wherein the monomers are polymerized to form a first alignment control layer on a surface of the first substrate facing the liquid crystal molecules, and form a second alignment control layer on a surface of the second substrate facing the liquid crystal molecules, and the thickness of the first alignment control layer and that of the second alignment control layer have a ratio of about 1/2-2/1.

8 Claims, 4 Drawing Sheets

(56) References Cited

OTHER PUBLICATIONS

English language translation of abstract of CN 1462898 (published Dec. 24, 2003).

English language translation of abstract of TW 200600938 (published Jan. 1, 2006).

English language translation of abstract of CN 101013262 (published Aug. 8, 2007).

English language translation of abstract of CN 101329479 (published Dec. 24, 2008).

English language translation of abstract of CN 101387781 (published Mar. 18, 2009).

English language translation of abstract of TW 201105713 (published Feb. 16, 2011).

* cited by examiner

METHOD FOR FABRICATING LIQUID CRYSTAL DISPLAY

CROSS REFERENCE TO RELATED APPLICATIONS

This Application claims priority of Taiwan Patent Application No. 100110556, filed on Mar. 28, 2011, the entirety of which is incorporated by reference herein.

BACKGROUND OF THE INVENTION

1. Field of the Invention

The present invention relates to a method for fabricating a liquid crystal display, and in particular relates to a method for fabricating a liquid crystal display with alignment control layers.

2. Description of the Related Art

Liquid crystal displays are widely used in personal computers, personal digital assistants (PDAs), mobile phones and TVs, due to the advantages of being light, having low power consumption, and having no radiation contamination. The conventional liquid displays are formed by a couple of substrates and a liquid crystal layer disposed therebetween. Before filling of the liquid crystal layer, an alignment layer is firstly coated on the substrates, and then is rubbed in a constant direction using a rubbing cloth. The alignment layer allows the liquid crystal layer to be aligned with a specific orientation. The polyimide (PI) is commonly used as the alignment layer.

However, the fabrication method for the alignment layer is time-consuming and tedious. Thus, a new method without an alignment layer has been developed. Monomers and liquid crystal molecules are filled between a TFT substrate and a color filter substrate. Then, the monomers are polymerized to form polymers by single-sided UV irradiation conduction to a side of the TFT substrate (or the color filter substrate). Next, polymers aggregate on the TFT substrate and the color filter substrate by a phase separation process.

However, due to uneven illumination of single-sided UV irradiated substrates, the polymers formed on the TFT substrate have a thickness which is thicker (or thinner) than that on the color filter substrate. Thus, undesirable bright spots may be formed in the local domain of a liquid crystal display, and process yield may be negatively affected.

Therefore, there is a need to develop a method for fabricating a liquid crystal display to resolve the above-mentioned problems.

BRIEF SUMMARY OF THE INVENTION

The invention provides a method for fabricating a liquid crystal display, comprising: providing a first substrate and a second substrate, wherein the first substrate and the second substrate are disposed oppositely to each other; filling a mixed solution between the first substrate and the second substrate, wherein the mixed solution comprises a plurality of liquid crystal molecules and a plurality of monomers; performing a UV light irradiation process to the mixed solution, wherein the monomers are polymerized to form a first alignment control layer on a surface of the first substrate facing the liquid crystal molecules, and form a second alignment control layer on a surface of the second substrate facing the liquid crystal molecules, and the thickness of the first alignment control layer and that of the second alignment control layer have a ratio of about 1/2-2/1.

A detailed description is given in the following embodiments with reference to the accompanying drawings.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
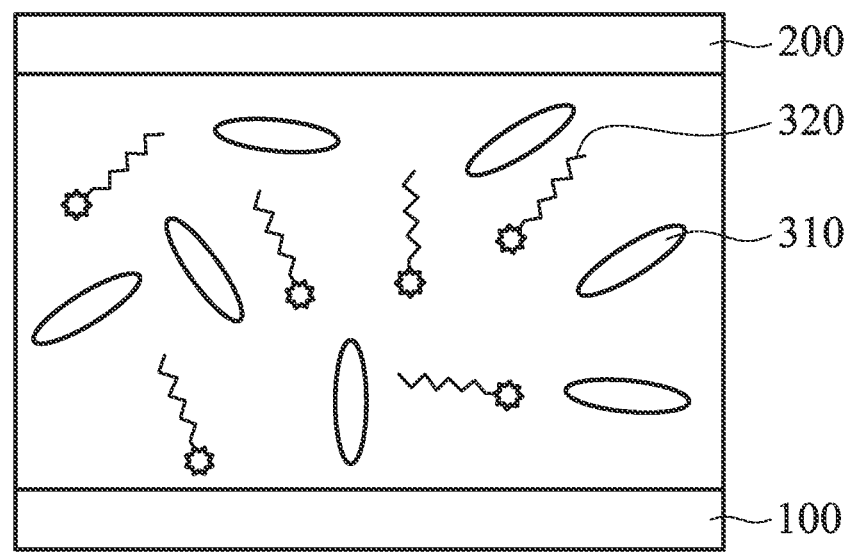
FIGS. 1-2 show cross-sectional schematic representations of a method for fabricating a liquid crystal display in accordance with a first embodiment of the invention.
Figure 2:
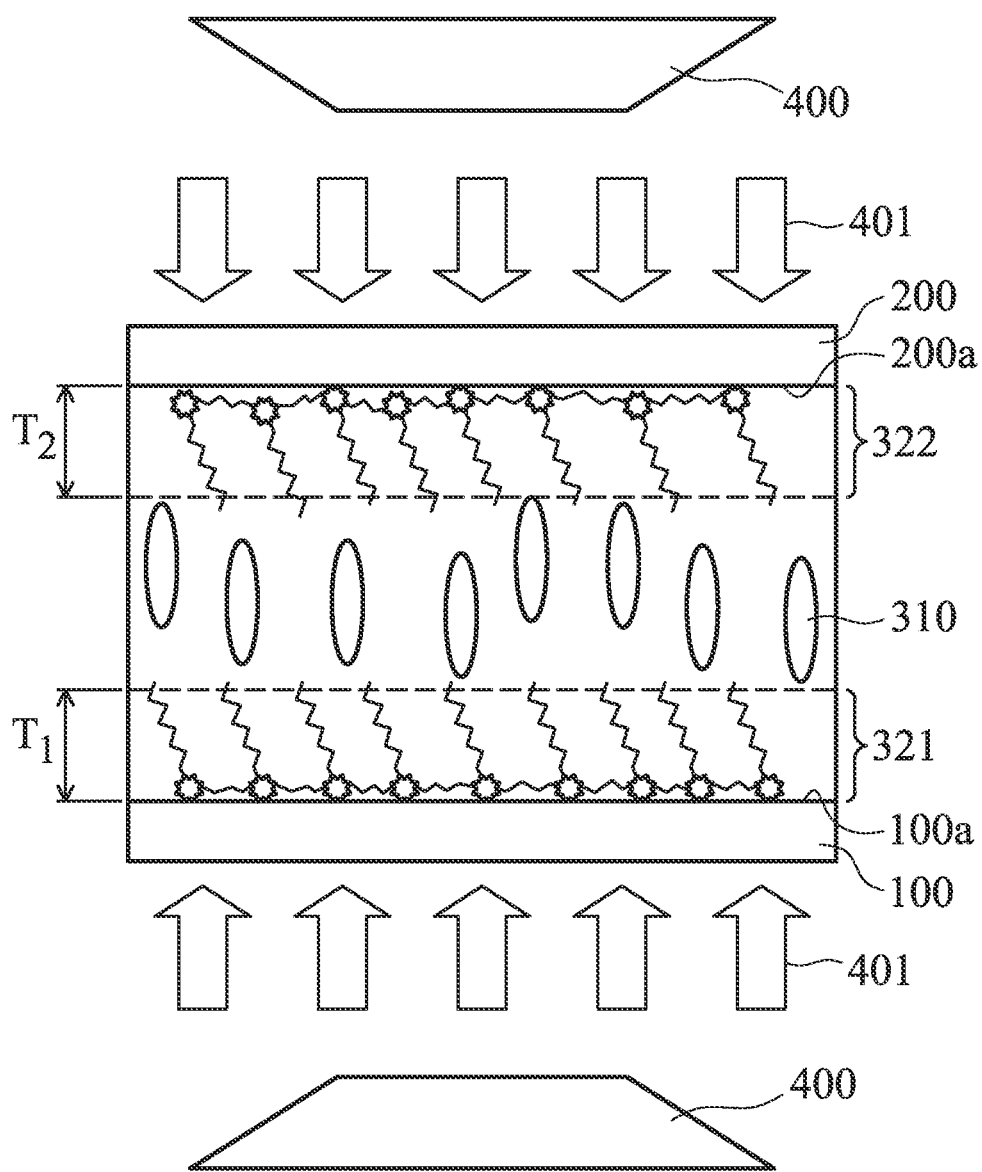

FIGS. 1-2 show the cross-sectional schematic representations of a method for fabricating a liquid crystal display in accordance with a first embodiment of the invention. Referring to FIG. 1, a first substrate 100 and a second substrate 200 are provided, and the first substrate 100 and the second substrate 200 are disposed oppositely to each other. In one embodiment, the first substrate 100 is a TFT substrate, and the second substrate 200 is a color filter substrate. The TFT substrate further comprises a thin film transistor, a pixel electrode, scan lines, data lines, and so on. (not shown in figure).

Then, a mixed solution is filled between the first substrate 100 and second substrate 200 by a one drop filling (ODF) method or injection method. The mixed solution comprises a plurality of liquid crystal molecules 310 and a plurality of monomers 320. The monomers 320 are made of different kinds of monomers and are polymerized by irradiating light thereon. In order to speed up the polymerization reaction, an initiator may be added into the mixed solution.

In one embodiment, the monomers 320 comprise a first monomer and a second monomer and have a weight ratio of 1/2-1/50. The first monomer has the formula (I):

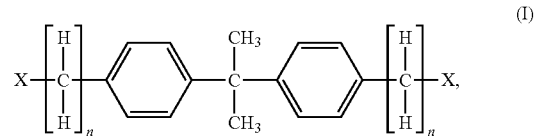

wherein n is an integer greater than 1, and X comprises an acrylate group or methacrylate group.

The second monomer has the formula (II):

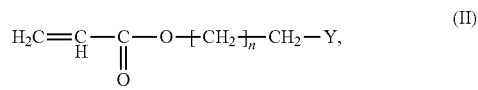

wherein n is an integer greater than 1, and Y comprises methyl or hydrogen.

In another embodiment, the monomers 320 comprise a first monomer and a second monomer. The first monomer has the formula (III):

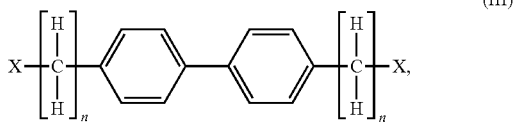

(III)

wherein n is an integer greater than 1, and X comprises an acrylate group or methacrylate group.

The second monomer has the formula (IV):

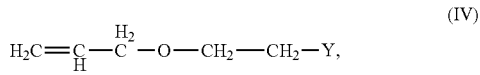

(IV)

wherein n is an integer greater than 1, and Y comprises methyl or hydrogen.

Referring to FIG. 2, a UV light irradiation process is performed to the mixed solution. A first light source is disposed on a side of the first substrate 100 away from the liquid crystal molecules 310 and a second light source is disposed on a side of the second substrate 200 away from the liquid crystal molecules 310. The first light source and the second light source are a couple of light sources 400. The UV light irradiation step 401 is conducted simultaneously to the first substrate 100 and second substrate 200.

After the UV light irradiation process, the monomers 320 are polymerized to form the polymers. The molecular weight of the polymers increase during the polymerization process. Then, the polymers and the liquid crystal molecules 310 are phase-separated, such that the polymers are deposited on a surface 100a of the first substrate 100 facing the liquid crystal molecules 310 and on a surface 200a of the second substrate 200 facing the liquid crystal molecules 310 to respectively form a first alignment control layer 321 and a second alignment control layer 322. Note that the first alignment control layer 321 and the second alignment control layer 322 have liquid crystal alignment properties similar to the polyimide (PI).

The thickness $T_1$ of the first alignment control layer 321 and the thickness $T_2$ of the second alignment control layer 322 are respectively about 40-80 Å, and a ratio of $T_1/T_2$ is preferably about 1/2-2/1.

The UV light irradiation process is performed for a time period of about 10 seconds-20 hours, and preferably about 5 seconds-30 minutes. The light sources 400 have energy of about 100-10,000 $mJ/cm^2$, and preferably about 1,000-8,000 $mJ/cm^2$. The light sources 400 have a wavelength of about 200-380 nm, and preferably about 240-280 nm. The light sources 400 have a power of about 5-200 $mW/cm^2$, and preferably 50-120 $mW/cm^2$.

In one embodiment, the first substrate 100 and the second substrate 200 are irradiated by the light sources 400 with a wavelength of about 300 nm, and a power of about 100 mW for 5 hours to form the first alignment control layer 321 having the thickness $T_1$ of 60 Å and the second alignment control layer 322 having the thickness $T_2$ of 70 Å.

Note that the alignment control layers of the invention are formed by polymerization of the monomers without any conventional polyimide (PI) alignment layer. In other words, the coating and rubbing process of the polyimide (PI) are not needed in the invention. Thus, compared with the prior art, the fabricating method of the invention is simpler, and results in production cost saving.

Figure 3A:
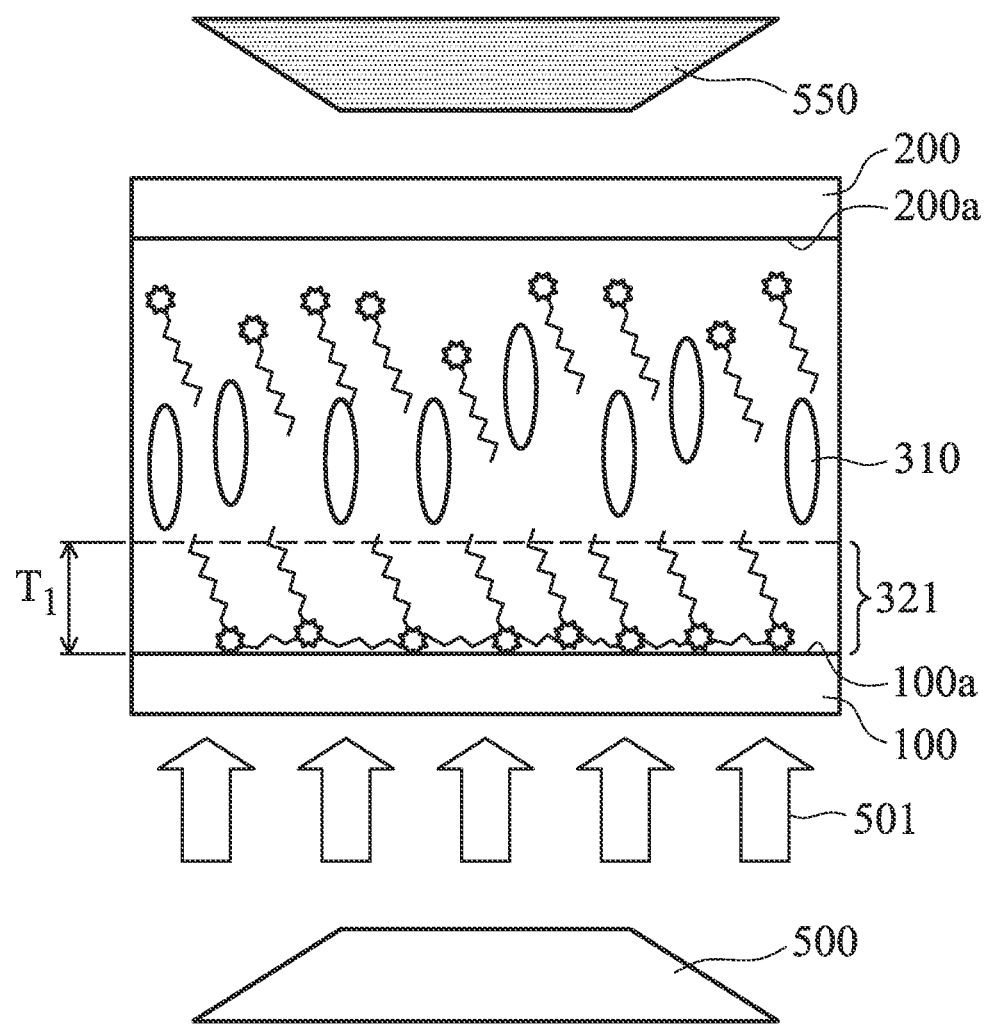
FIGS. 3A-3B show cross-sectional schematic representations of a method for fabricating a liquid crystal display in accordance with a second embodiment of the invention.
Figure 3B:
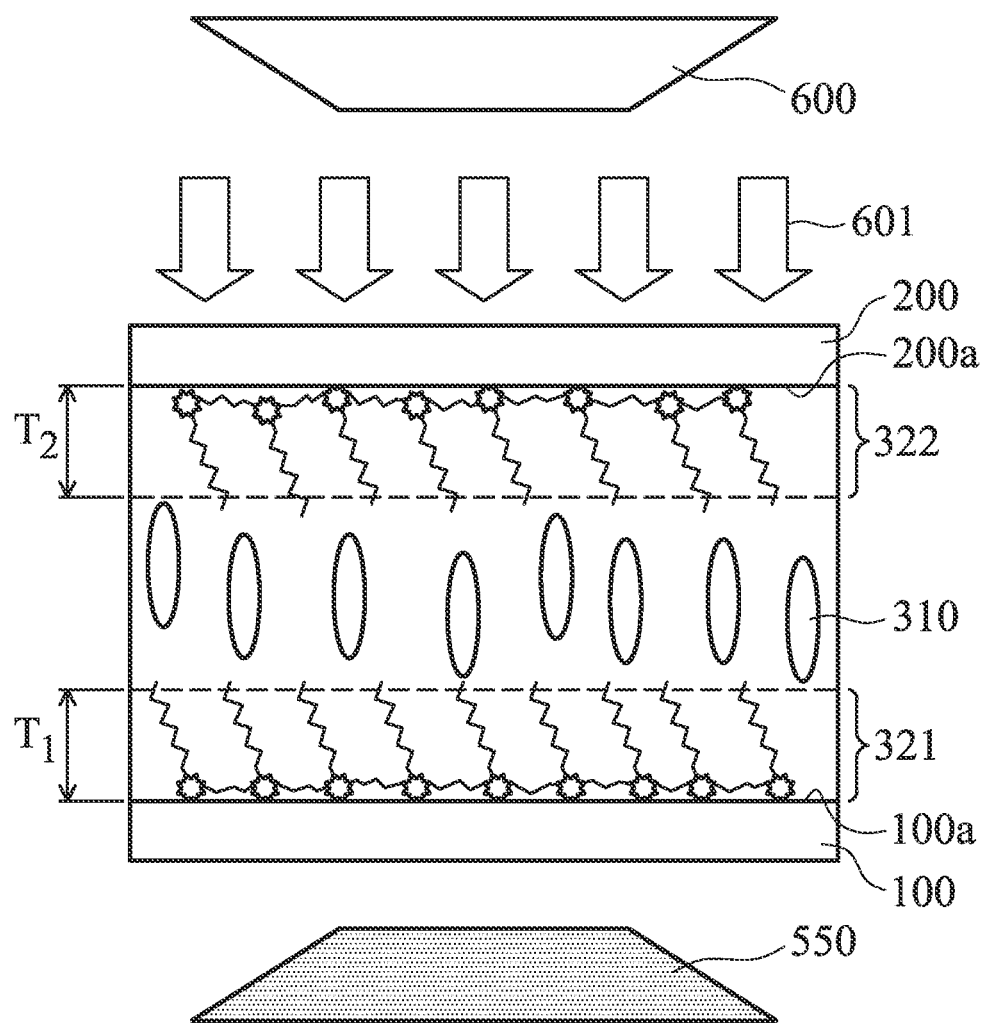

FIGS. 3A-3B show the cross-sectional schematic representations of a method for fabricating a liquid crystal display in accordance with a second embodiment of the invention, wherein like element are identified by the same reference numbers as in FIGS. 1-2, and thus omitted for clarity.

Referring to FIG. 3A, after filling the mixed solution between the first substrate 100 and the second substrate 200, a first light source 500 is disposed on a side of the first substrate 100 away from the liquid crystal molecules 310. Then, a first irradiation step 501 is conducted to the first substrate 100. Additionally, a UV light absorbing material 550 (such as black material) is disposed on a side of the second substrate 200 away from the liquid crystal molecules 310 to absorb the energy of the first light source 500. Next, the first alignment control layer 321 is formed on the surface 100a of the first substrate 100 facing the liquid crystal molecules 310.

Then, referring to FIG. 3B, the first light source 500 is removed. A second light source 600 is disposed on a side of the second substrate 200 away from the liquid crystal molecules 310. Then, a second irradiation step 601 is conducted to the second substrate 200. Additionally, the UV light absorbing material 550 (such as black material) is disposed on a side of the first substrate 100 away from the liquid crystal molecules 310 to absorb the energy of the second light source 600. Next, the second alignment control layer 322 is formed on the surface 200a of the second substrate 200 facing the liquid crystal molecules 310.

Alternatively, the second substrate 200 may be irradiated prior to the first substrate 10. Those skilled in the art may adjust the order and time of the first irradiation step and the second irradiation step to obtain the wanted thickness $T_1$ of the first alignment control layer 321 and thickness $T_2$ of the second alignment control layer 322.

Note that in the second embodiment, the first substrate 100 and the second substrate 200 are sequentially irradiated. The irradiation cycle may be repeated for one time or several times to adjust the thickness $T_1$ of the first alignment control layer 321 and the thickness $T_2$ of the second alignment control layer 322 to obtain a preferable $T_1/T_2$ ratio of about 1/2-2/1.

The first irradiation step 501 and the second irradiation step 601 are respectively performed for a time period of about 10 seconds-20 hours. The first light source 500 and the second light source 600 respectively have energy of about 100-10,000 $mJ/cm^2$, a wavelength of about 200-380 nm and a power of about 5-200 $mW/cm^2$.

In prior art, due to uneven illumination of the single-sided irradiation for the substrates, the polymers formed on the TFT substrate have a thickness thicker (or thinner) than that on the color filter substrate, such that the alignment property of the liquid crystal molecules is deteriorated. Compared with the prior art, a double-side irradiation process is conducted, or the first substrate 100 and the second substrate 200 are sequentially irradiated. Thus, the thickness difference between the first alignment control layer and the second alignment control layer is decreased by the method of the invention and a preferable $T_1/T_2$ ratio of about 1/2-2/1 is obtained. Furthermore, the undesirable bright spots of the prior art may not be formed in the liquid crystal display of the invention, thus improving process yields.

The liquid crystal display of the invention may be applied to a wide-viewing angle liquid crystal display (LCD), such as a multi-domain vertical alignment (MVA), advanced super-V (ASV), patterned vertical alignment (PVA), and polymer stable alignment (PSA) LCD, etc.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for fabricating a liquid crystal display, comprising:
   providing a first substrate and a second substrate, wherein the first substrate and the second substrate are disposed oppositely to each other;
   filling a mixed solution between the first substrate and the second substrate, wherein the mixed solution comprises a plurality of liquid crystal molecules and a plurality of monomers;
   performing a UV light irradiation process to the mixed solution, wherein the monomers are polymerized to form a first alignment control layer on a surface of the first substrate facing the liquid crystal molecules, and form a second alignment control layer on a surface of the second substrate facing the liquid crystal molecules, and a thickness of the first alignment control layer and that of the second alignment control layer have a ratio of about 1/2-2/1, wherein the UV light irradiation process comprises the steps of disposing a first light source on a side of the first substrate away from the liquid crystal molecules and disposing a UV light absorbing material on a side of the second substrate away from the liquid crystal molecules.

2. The method for fabricating the liquid crystal display as claimed in claim 1, wherein the first alignment control layer and the second alignment control layer respectively has a thickness of about 60 Å-70 Å.

3. The method for fabricating the liquid crystal display as claimed in claim 1, wherein the UV light irradiation process is conducted for a time period of about 10 seconds-20 hours.

4. The method for fabricating the liquid crystal display as claimed in claim 1,
   after disposing the first light source on the side of the first substrate away from the liquid crystal molecules further comprising:
   performing a first irradiation step to the first substrate;
   removing the first light source;
   disposing a second light source on the side of the second substrate away from the liquid crystal molecules; and
   performing a second irradiation step to the second substrate.

5. The method for fabricating the liquid crystal display as claimed in claim 4, wherein the light sources have an energy of about 100-10,000 $mJ/cm^2$.

6. The method for fabricating the liquid crystal display as claimed in claim 4, wherein the light sources have a wavelength of about 200 nm-380 nm.

7. The method for fabricating the liquid crystal display as claimed in claim 4, wherein the light sources have a power of about 5-200 $mW/cm^2$.

8. The method for fabricating the liquid crystal display as claimed in claim 4, wherein disposing the second light source on the side of the second substrate away from the liquid crystal molecules further comprises:
   disposing a UV light absorbing material on the side of the first substrate away from the liquid crystal molecules.

* * * * *